United States Patent
Bailey et al.

(10) Patent No.: US 8,929,434 B2
(45) Date of Patent: Jan. 6, 2015

(54) VIDEO ENHANCEMENT INTERNET MEDIA EXPERIENCE IN CONVERTING HIGH DEFINITION FORMATS TO VIDEO FORMATS

(75) Inventors: Kenneth Stephen Bailey, Newport Beach, CA (US); Christopher Carmichael, Laguna Beach, CA (US)

(73) Assignee: Ubiquity Broadcasting Corporation, Irvine, CA (US)

( * ) Notice: Subject to any disclaimer, the term of this patent is extended or adjusted under 35 U.S.C. 154(b) by 1247 days.

(21) Appl. No.: 11/866,943

(22) Filed: Oct. 3, 2007

(65) Prior Publication Data

US 2008/0106639 A1 May 8, 2008

Related U.S. Application Data

(60) Provisional application No. 60/851,514, filed on Oct. 14, 2006.

(51) Int. Cl.
- *H04N 7/12* (2006.01)
- *H04N 19/17* (2014.01)
- *G06T 3/00* (2006.01)
- *H04N 7/01* (2006.01)
- *H04N 19/139* (2014.01)
- *H04N 19/63* (2014.01)
- *H04N 19/59* (2014.01)
- *H04N 19/61* (2014.01)

(52) U.S. Cl.
CPC .......... *H04N 19/0026* (2013.01); *G06T 3/0012* (2013.01); *H04N 7/0125* (2013.01); *H04N 19/00151* (2013.01); *H04N 19/00818* (2013.01); *H04N 19/00757* (2013.01); *H04N 19/00781* (2013.01)
USPC ... 375/240.01; 348/458; 348/441; 348/426.1; 348/606; 348/616; 348/625; 348/607

(58) Field of Classification Search
None
See application file for complete search history.

(56) References Cited

U.S. PATENT DOCUMENTS

| | | | | |
|---|---|---|---|---|
| 6,809,731 B2* | 10/2004 | Muffler et al. | ................ | 345/428 |
| 6,996,184 B2* | 2/2006 | Hamamatsu et al. | .... | 375/240.25 |
| 7,489,336 B2* | 2/2009 | Lim | .......................... | 348/181 |
| 7,701,509 B2* | 4/2010 | Liu et al. | ....................... | 348/452 |
| 2003/0214502 A1* | 11/2003 | Park et al. | ...................... | 345/420 |
| 2004/0045030 A1* | 3/2004 | Reynolds et al. | .................. | 725/110 |
| 2005/0259738 A1* | 11/2005 | Horishi et al. | ........... | 375/240.16 |
| 2006/0123058 A1* | 6/2006 | Mercer et al. | .............. | 707/104.1 |
| 2006/0176957 A1* | 8/2006 | Han et al. | .................. | 375/240.16 |
| 2006/0259942 A1* | 11/2006 | Toyama et al. | ................ | 725/133 |
| 2007/0076982 A1* | 4/2007 | Petrescu | ....................... | 382/294 |

* cited by examiner

*Primary Examiner* — Kibrom T Hailu
(74) *Attorney, Agent, or Firm* — Law Office of Scott C. Harris, Inc.

(57) ABSTRACT

Image or video from a cell phone is processed to expand the image in a way to display it on a high definition video screen.

7 Claims, 2 Drawing Sheets

VIDEO ENHANCEMENT INTERNET MEDIA EXPERIENCE IN CONVERTING HIGH DEFINITION FORMATS TO VIDEO FORMATS

The present application claims priority from provisional application No. 60/851,514 filed Oct. 14, 2006, the disclosure of which is here with incorporated by reference.

BACKGROUND

The proliferation of personal communication devices has changed the way people communicate. Almost everybody today has a cellular telephone. At the same time, modern technology has changed the way people communicate in writing (e-mail and text messages), and has also changed the delivery of electronic media such as images motion pictures and the like.

Since a mobile phone can be used to both obtain and also to view both images and videos, it becomes possible to watch videos over a cellular phone. It also becomes possible to obtain a picture or a clip on one cellular phone, and send it to another cellular phone, providing a real-time picture book of what one user is doing.

The inventors of the present invention have coined the term "Mobisode" to refer to a short video that has taken on a cellular phone and sent to a different cellular phone. It is important to maintain the video quality while minimizing the amount of bandwidth used by such a mobisode. For example, a cellular phone video may use only 36,000 pixels per frame to avoid it overwhelming the capacity of the cellular network. This causes issues when trying to display such a video on a big screen TV.

SUMMARY

The present application describes compression techniques and describes techniques for use in a video system, and also describes techniques for converting between high definition video and images and cellular phone definition video and images.

The term 'images' as used herein is intended to cover both still images, as well as frames of a video.

According to an embodiment, video images from a portable device such as a cellular phone are enhanced in real time to depict the images on a 16×9 aspect ratio display screen. An embodiment processes the images by separating the background from the foreground/motion parts of the image, and processes these portions of the image differently.

DETAILED DESCRIPTION

A classic motion estimation attempts to minimize energy between differences between frames. The inventor conceptualized this as a bit allocation issue for both most displaced frame differences. The inventor investigated a number of different ways of allocating bits depending on quantization constrained motion estimation. These techniques included Ramachandran, Ortega, and Vetterli investigations. Based on these investigations, the inventors discovered that a rate constrained motion estimation using Lagrangian cost function may be optimal for this operation, and may require 1.3 megapixels per frame.

According to the present system, a combination of a linear transform as well as motion compensation is used. The linear transform in the temporal direction is less efficient when significant motion is prevalent. A lifting scheme can be used to construct the kernels of the image. Moreover, a two channel decomposition can be achieved using a sequence of prediction and update steps that form a ladder structure as described herein. The lifting structure can map integers to integers without requiring invertible lifting steps. This allows motion compensation to be incorporated into the prediction and update steps.

Figure 1:
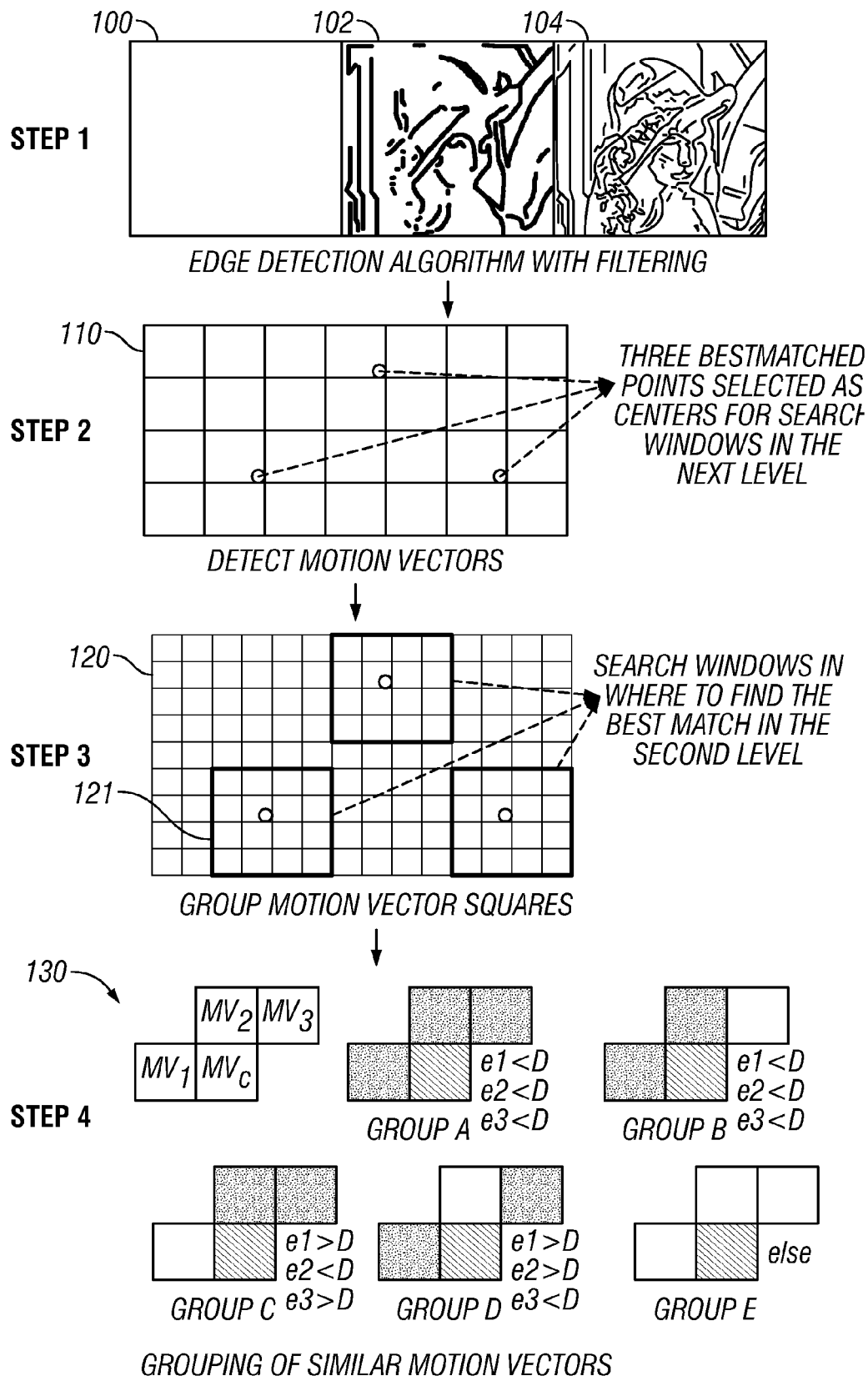
FIG. 1 illustrates finding and grouping of motion vectors.

The present application describes a coding scheme that processes areas within images or frames. At 100 in FIG. 1, the image is decomposed in the temporal direction, filtered, and edge detected. The decomposition may be dyadic, and may use a motion compensated wavelet. This temporal transform provides K output pictures which are intra-frame coded. A basic predictive coder with motion compensation using an 8×8 DCT with run length coding is used at 110 to detect motion vectors. A haar wavelet with its motion vectors set to zero may be used to provide a dynamic decomposition as an orthonormal transform. Half pel accurate motion compensation may also be used with bilinear interpretation. The motion fields between the odd and even fields may be invertible, allowing the corresponding motion vectors in the update and prediction steps to form areas at 120. These areas 120 are formed from points within the images For example, the best matched points may be selected as centers for search windows in the next level. At 120, the search windows identified in 110 have motion vector squares 121 formed around these areas. The motion vectors for these areas are grouped. 130 illustrates the grouping, where presumably these motion vectors will be similar.

Figure 2:
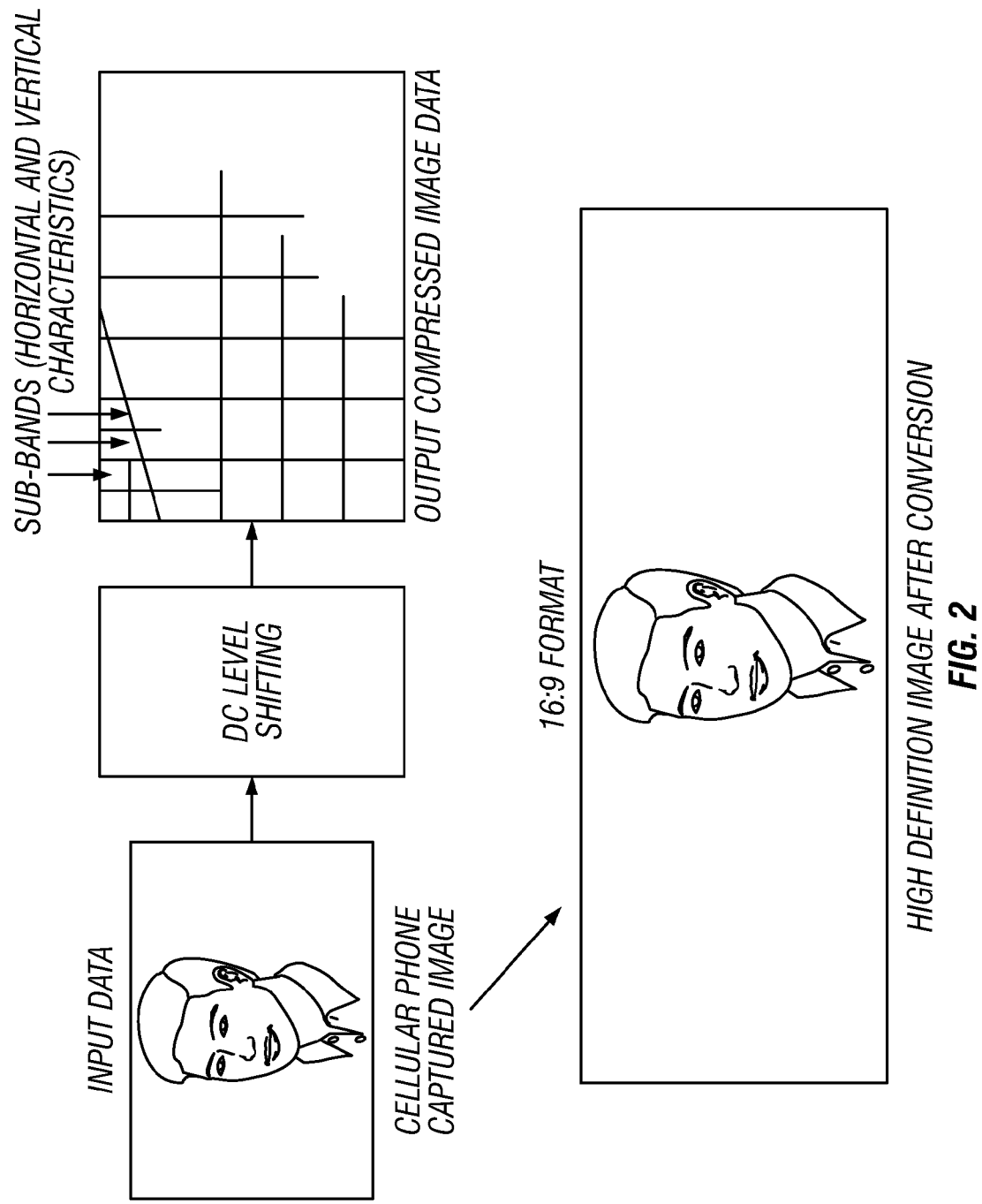
FIG. 2 illustrates converting a cell phone image to a high definition image.

FIG. 2 illustrates how to fill a larger format area. In the embodiment, a block size of 16×16, with half pel accurate motion compensation in the prediction may be used to select the motion vectors to minimize the squared error in a high band information.

Whatever system is used, the pixel data is sampled at a rate of 24 frames per second, and interpolation is used to allow the low quality pixels (e.g. 36,000 pixels) to fill a standard high-definition screen that has approximately 1.2 million pixels. For example, in the case of talking heads, the background field of pixels is separated from the talking head portion. The entire frame is recast at the higher resolution by using superimposed motion prediction techniques. A combination of motion compensated wavelet and rate constrained superimposed motion compensation is used to reduce the distortion.

The embodiment captures a frame of streaming video, and analyzes and converts that frame to the proper number of pixels to be appropriately displayed on a widescreen television using fractional fractal dimension calculation.

In one embodiment, the cellular phone image is separated into motion areas and background areas. The background areas are expanded to fill the wider format of the high definition area. The background areas may be expanded to fill that area and thereby, in essence, "pad" the extra aspect ratio area.

The general structure and techniques, and more specific embodiments which can be used to effect different ways of carrying out the more general goals are described herein.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, this may be used to pad any cell phone image to any high def size image, e.g, any image bigger than 720i.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be an Intel (e.g., Pentium or Core 2 duo) or AMD based computer, running Windows XP or Linux, or may be a Macintosh computer. The computer may also be a handheld computer, such as a PDA, cellphone, or laptop.

The programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium.or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A method, comprising: obtaining multiple video frames from a cellular phone; determining areas of motions within the video frames from the cellular phone; based on said areas of motions, separating the video frames into motion areas and background areas; and separating the background areas from the motion areas; and recasting the frame at a higher resolution format by using a computer for expanding the background areas to fill a higher resolution format frame, where the higher resolution format frame has a wider aspect ratio than the video frames from the cellular phone, and the expanding of the background area uses those background areas to fill the wider format aspect ratio, while using motion compensation to reduce distortion in the motion areas, to convert the multiple video frames from the cellular phone from a format intended for a cellular telephone screen to the higher resolution format frame.

2. A method as in claim 1, wherein said motion areas of the video frames represent areas with motion vectors greater than a specified amount.

3. A method comprising:
using a computer for converting a video from a cellular phone to a size that can be displayed on a high definition display screen greater than 720i, and at an aspect ratio of 16×9, wherein said computer separates background areas from motion areas in the video, and recasts the video at a higher resolution format by expanding background areas to fill a higher resolution format frame, where the higher resolution format frame has a wider aspect ratio than the video from the cellular phone, and the expanding of the background area uses those background areas to fill the wider format aspect ratio.

4. A method as in claim 1, wherein said recasting recasts the video frames to fill a 16×9 image screen using expansion of the background.

5. A video converting system, comprising:
a processor obtaining multiple video frames from a cellular phone, determining areas of motions within the video frames from the cellular phone, and based on said areas of motion, separating the video frames into motion areas and background areas, said processor separating the background areas from the motion areas, and recasting the video frames at a higher resolution format by expanding the background areas to fill the higher resolution format frame, where the higher resolution format frame has a wider aspect ratio than the video frames from the cellular phone, and the processor expands the background area by using those background areas to fill the wider format aspect ratio, while using motion compensation to reduce distortion in the motion areas, to convert the multiple video frames from the cellular phone from a format intended for a cellular telephone screen to the higher resolution format frame.

6. A system as in claim 5, wherein said motion areas of the video frames represent areas with motion vectors greater than a specified amount.

7. A system as in claim 5, wherein said recasting recasts the frame to fill a 16×9 image screen using expansion of the background areas.

* * * * *